(12) United States Patent
Li et al.

(10) Patent No.: US 11,381,166 B2
(45) Date of Patent: Jul. 5, 2022

(54) SWITCH POWER SUPPLY CIRCUIT

(71) Applicant: CRM ICBG (WUXI) CO. LTD., Jiangsu (CN)

(72) Inventors: Jin Li, Jiangsu (CN); Yong You, Jiangsu (CN)

(73) Assignee: CRM ICBG (WUXI) CO. LTD., Jiangsu (CN)

( * ) Notice: Subject to any disclaimer, the term of this patent is extended or adjusted under 35 U.S.C. 154(b) by 0 days.

(21) Appl. No.: 17/257,468

(22) PCT Filed: Dec. 31, 2019

(86) PCT No.: PCT/CN2019/130470
§ 371 (c)(1),
(2) Date: Dec. 31, 2020

(87) PCT Pub. No.: WO2020/207069
PCT Pub. Date: Oct. 15, 2020

(65) Prior Publication Data
US 2022/0021303 A1  Jan. 20, 2022

(30) Foreign Application Priority Data
Apr. 8, 2019  (CN) .......................... 201910274700.2

(51) Int. Cl.
*H02M 3/155* (2006.01)
*H02M 1/08* (2006.01)

(52) U.S. Cl.
CPC ............. *H02M 3/155* (2013.01); *H02M 1/08* (2013.01)

(58) Field of Classification Search
CPC ........ H02M 3/155; H02M 1/08; H02M 3/158; H02M 3/1584
See application file for complete search history.

(56) References Cited

U.S. PATENT DOCUMENTS

| 9,444,321 B2 * | 9/2016 | Xu ........................ G01R 19/175 |
| 11,152,848 B2 * | 10/2021 | Li ............................ H02M 1/08 |
| 2012/0049812 A1 * | 3/2012 | Pinon ....................... H02M 1/08 323/271 |
| 2014/0218978 A1 * | 8/2014 | Heuken ............. H02M 3/33523 363/21.16 |

FOREIGN PATENT DOCUMENTS

| CN | 1879282 A | 12/2006 |
| CN | 102289237 A | 12/2011 |
| CN | 102625513 A | 8/2012 |
| WO | WO 2013094241 | 6/2013 |

* cited by examiner

*Primary Examiner* — Kyle J Moody
(74) *Attorney, Agent, or Firm* — Global IP Services; Tianhua Gu

(57) ABSTRACT

The present disclosure provides a switch power supply circuit, which includes a step-down transistor, a control module, a first switch transistor, a second switch transistor, a third switch transistor, and a power switch transistor. In the switch power supply circuit of the present disclosure, the first terminal of the second switch transistor is directly coupled with the input voltage, and the second switch transistor can directly obtain sufficient driving current from the input voltage to drive the power switch transistor. The present application can ensure the reliability and efficiency of the system without an additional energy storage capacitor, which reduces the costs of the system.

10 Claims, 1 Drawing Sheet

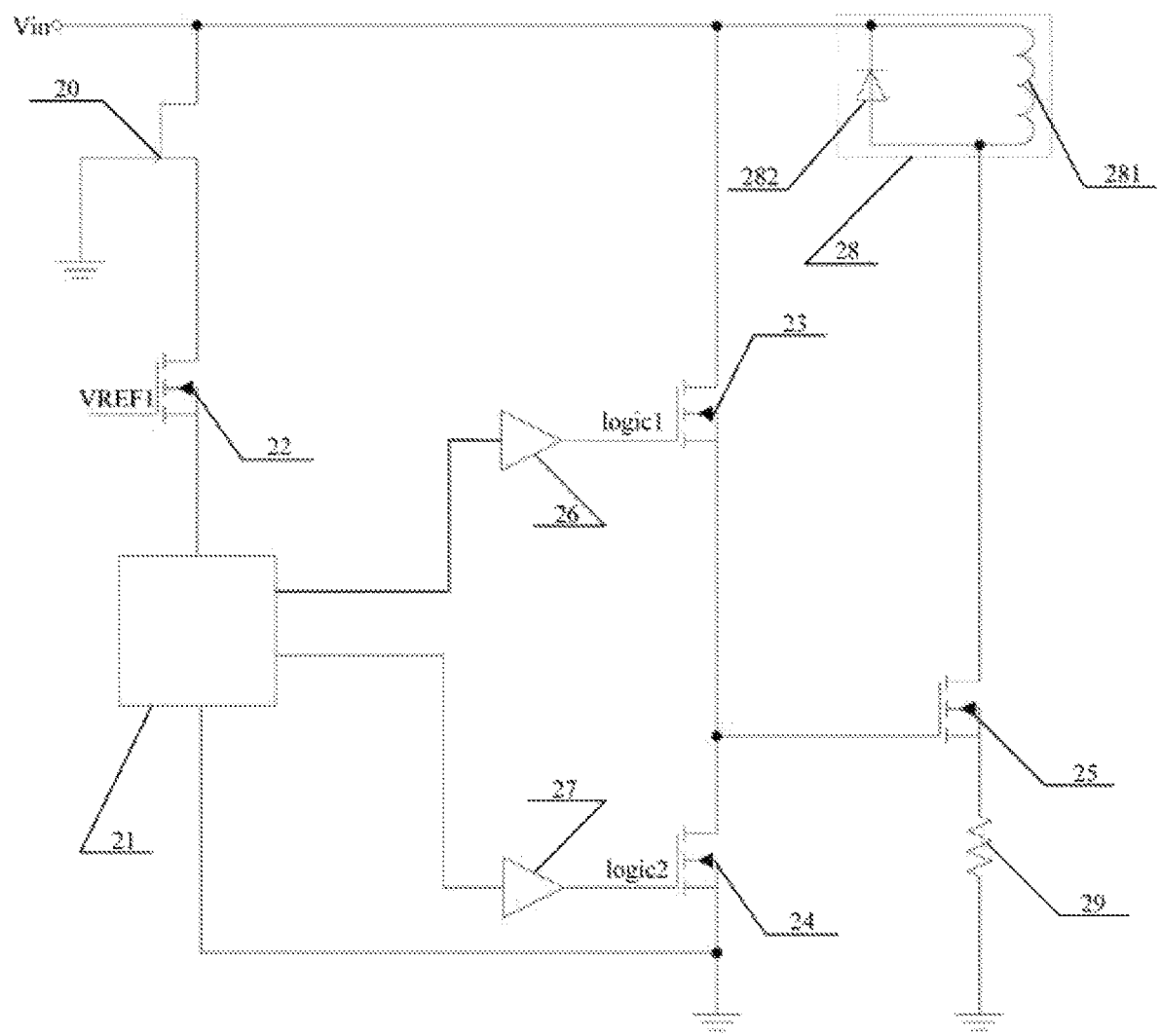

SWITCH POWER SUPPLY CIRCUIT

CROSS REFERENCE TO RELATED APPLICATION

This is a Sect. 371 National Stage of PCT International Application No. PCT/CN2019/130470, filed on 31 Dec. 2019, which claims priority of a Chinese Patent Application No. CN2019102747002 filed on 8 Apr. 2019, the contents of which are incorporated herein by reference in its entirety for all purposes.

BACKGROUND

Technical Field

The present disclosure relates to the technical field of circuit design, in particular, to a switch power supply circuit.

Description of Related Arts

The power switch transistor of the switch power supply system needs to be driven during operation. At the moment when the power switch transistor is driven, sufficient driving current needs to be provided to the gate of the power switch transistor to meet the reliability and effectiveness of the switch power supply system. An energy storage capacitor to the ground needs to be connected to the power supply pin of the switch power supply chip to ensure that the power switch transistor has sufficient current at the moment of driving. The additional energy storage capacitor will inevitably lead to high costs of the switch power supply system.

SUMMARY

The present disclosure provides a switch power supply circuit to solve the problem of high costs caused by the additional energy storage capacitor.

The present disclosure provides a switch power supply circuit, which includes: a step-down transistor, a first switch transistor, a control module, a power switch transistor, a second switch transistor, and a third switch transistor.

The step-down transistor includes a first terminal, a second terminal, and a third terminal. The first terminal of the step-down transistor is coupled with an input voltage, and the second terminal of the step-down transistor is grounded.

The first switch transistor includes a first terminal, a second terminal, and a control terminal. The control terminal of the first switch transistor is coupled with a reference voltage signal, the first terminal of the first switch transistor is coupled with the third terminal of the step-down transistor.

The control module includes an input terminal, an output terminal, and a grounded terminal. The input terminal of the control module is coupled with the second terminal of the first switch transistor, and the grounded terminal of the control module is grounded, the control module is configured to generate a first control signal and a second control signal, which are output through the output terminal of the control module.

The power switch transistor includes a first terminal, a second terminal, and a control terminal.

The second switch transistor includes a first terminal, a second terminal, and a control terminal. The control terminal of the second switch transistor is coupled with the output terminal of the control module to receive the first control signal, the first terminal of the second switch transistor is coupled with the input voltage, and the second terminal of the second switch transistor is coupled with the control terminal of the power switch transistor.

The third switch transistor includes a first terminal, a second terminal, and a control terminal. The control terminal of the third switch transistor is coupled with the output terminal of the control module to receive the second control signal, the first terminal of the third switch transistor is coupled with the control terminal of the power switch transistor, and the second terminal of the third switch transistor is grounded.

As described above, the switch power supply circuit of the present disclosure has the following beneficial effects:

In the switch power supply circuit of the present disclosure, the first terminal of the second switch transistor is directly coupled with the input voltage, and the second switch transistor can directly obtain sufficient driving current from the input voltage to drive the power switch transistor. The present application can ensure the reliability and efficiency of the system without an additional energy storage capacitor, which reduces the costs of the system. At the same time, the first switch transistor supplies power to the control module, and the second switch transistor supplies power to the power switch transistor, which reduces interference to the control module.

BRIEF DESCRIPTION OF THE DRAWINGS

FIG. 1 shows a circuit diagram of a switch power supply circuit according to the present disclosure.

DETAILED DESCRIPTION OF THE PREFERRED EMBODIMENTS

The embodiments of the present disclosure will be described below. Those skilled may easily understand other advantages and effects of the present disclosure according to contents disclosed by the specification.

Referring to FIG. 1, the present disclosure provides a switch power supply circuit, which includes: a step-down transistor 20, a control module 21, a first switch transistor 22, a second switch transistor 23, a third switch transistor 24, and a power switch transistor 25.

The step-down transistor 20 includes a first terminal, a second terminal, and a third terminal. The first terminal of the step-down transistor 20 is coupled with an input voltage Vin, and the second terminal of the step-down transistor 20 is grounded. The step-down transistor 20 adjusts the input voltage Vin from a high voltage to a voltage that the first switch transistor 22 can withstand.

The first switch transistor 22 includes a first terminal, a second terminal, and a control terminal. The control terminal of the first switch transistor 22 is coupled with a reference voltage signal VREF1, and the first terminal of the first switch transistor 22 is coupled with the third terminal of the step-down transistor 20. The first switch transistor 22 converts, the voltage output by the step-down transistor 20 into a working voltage VCC based on the reference voltage signal VREF1 and provides it to the control module 21.

The control module 21 includes an input terminal, an output terminal, and a grounded terminal. The input terminal of the control module 21 is coupled with the second terminal of the first switch transistor 22, and the grounded terminal of the control module 21 is grounded. The control module 21 generates a first control signal and a second control signal, which are output through the output terminal of the control module 21.

The power switch transistor 25 includes a first terminal, a second terminal, and a control terminal.

The second switch transistor 23 includes a first terminal, a second terminal, and a control terminal. The control terminal of the second switch transistor 23 is coupled with the output terminal of the control module 21. The first terminal of the second switch transistor 23 is coupled with the input voltage Vin, and the second terminal of the second switch transistor 23 is coupled with the control terminal of the power switch transistor 25 to receive the first control signal. The second switch transistor 23 converts the input voltage Vin into a driving voltage and outputs the driving voltage to the power switch transistor 25.

The third switch transistor 24 includes a first terminal, a second terminal, and a control terminal. The control terminal of the third switch transistor 24 is coupled with the output terminal of the control module 21 to receive the second control signal. The first terminal of the third switch transistor 24 is coupled with the control terminal of the power switch transistor 25, and the second terminal of the third switch transistor 24 is grounded.

In the switch power supply circuit of the present disclosure, the first terminal of the second switch transistor 23 is directly coupled to the input voltage Vin, and the second switch transistor 23 can directly obtain sufficient driving current from the input voltage Vin to drive the power switch transistor 25. The present application can ensure the reliability and efficiency of the system without an additional energy storage capacitor, which reduces the costs of the system. At the same time, the first switch transistor 22 supplies power to the control module 21, and the second switch transistor 23 supplies power to the power switch transistor 25, which reduces interference to the control module 21.

The switch power supply circuit further includes a first buffer 26 and a second buffer 27. One terminal of the first buffer 26 is coupled with the output terminal of the control module 21, the other terminal of the first buffer 26 is coupled with the control terminal of the second switch transistor 23. The output terminal of the control module 21 is coupled with the control terminal of the second switch transistor 23 through the first buffer 26. The first buffer 26 buffers the first control signal to form a first buffer control signal logic1 and outputs the first buffer control, signal logic1 to the control terminal of the second switch transistor 23. One terminal of the second buffer 27 is coupled with the output terminal of the control module 21, the other terminal of the second buffer 27 is coupled with the control terminal of the third switch transistor 24. The output terminal of the control module 21 is coupled with the control terminal of the third switch transistor 24 through the second buffer 27. The second buffer 27 buffers the second control signal to form a second buffer control signal logic2 and outputs the second buffer control signal logic2 to the third switch transistor 24.

The switch power supply circuit further includes a freewheeling circuit 28. As an example, the freewheeling circuit 28 includes an inductor 281 and a diode 282. One terminal of the inductor 281 is coupled with the input voltage Vin, and the other terminal of the inductor 281 is coupled with the first terminal of the power switch transistor 25. An anode of the diode 282 is coupled with the first terminal of the power switch transistor 25, and a cathode of the diode 282 is coupled with the input voltage Vin.

It should be noted that the freewheeling circuit 28 is not limited to the above structure, and any freewheeling circuit 28 can be applied to the switch power supply circuit.

As an example, the switch power supply circuit further includes a sampling resistor 29. One terminal of the sampling resistor 29 is coupled with the second terminal of the power switch transistor 25, and the other terminal of the sampling resistor 29 is grounded.

As an example, the step-down transistor 20, the control module 21, the first switch transistor 22, the second switch transistor 23, the third switch transistor 24, the power switch transistor 25, the first buffer 26, the second buffer 27, the freewheeling circuit 28, and the sampling resistor 29 are all integrated in the same chip (not shown in the figure).

As an example, since the step-down transistor 20 is directly coupled to the input voltage. Vin, and the voltage of the input voltage Vin is high, the step-down transistor 20 needs to include a high voltage withstand device. The withstand voltage of the step-down transistor 20 may be set according to actual needs, but the withstand voltage of the step-down transistor 20 should be greater than the input voltage Vin. Preferably, the withstand voltage of the step-down transistor 20 may be greater than or equal to 500 volts.

As an example, the step-down transistor 20 may include a junction field effect transistor (jfet transistor).

Similarly, since the second switch transistor 23 is directly coupled to the input voltage Vin, the second switch transistor 23 needs to include a high voltage withstand device. The withstand voltage of the second switch transistor 23 may be set according to actual needs, but the withstand voltage of the second switch transistor 23 should be greater than the input voltage Vin. Preferably, the withstand voltage of the second switch transistor 23 may be greater than or equal to 500 volts.

As an example, the reference voltage signal VREF1 is generated by a Zener diode or based on a band gap reference voltage.

As an example, the step-down transistor 20 includes an N-type junction field effect transistor. The drain of the step-down transistor 20 is the first terminal of the step-down transistor 20. The source of the step-down transistor 20 is the third terminal of the step-down transistor 20. The gate of the step-down transistor 20 is the second terminal of the step-down transistor 20. That is, the gate of the step-down transistor 20 is grounded, and the drain of the step-down transistor 20 is coupled with the input voltage Vin.

The power switch transistor 25 includes an NMOS transistor. The gate of the power switch transistor 25 is the control terminal of the power switch transistor 25, the drain of the power switch transistor 25 is the first terminal of the power switch transistor 25, and the source of the power switch transistor 25 is the second terminal of the power switch transistor 25.

The first switch transistor 22 includes an NMOS transistor. The gate of the first switch transistor 22 is the control terminal of the first switch transistor 22, the drain of the first switch transistor 22 is the first terminal of the first switch transistor 22, and the source of the first switch transistor 22 is the second terminal of the first switch transistor 22. That is, the gate of the first switch transistor 22 is coupled with the reference voltage signal VREF1, the drain of the first switch transistor 22 is coupled with the source of the step-down transistor 20, and the source of the first switch transistor 22 is coupled with the input terminal of the control module 21.

The second switch transistor 23 includes an NMOS transistor. The gate of the second switch transistor 23 is the control terminal of the second switch transistor 23, the drain of the second switch transistor 23 is the first terminal of the second switch transistor 23, and the source of the second switch transistor 23 is the second terminal of the second switch transistor 23. The gate of the second switch transistor 23 is coupled with the output terminal of the control module 21 through the first buffer 26, the drain of the second switch transistor 23 is coupled with the input voltage Vin, and the source of the second switch transistor 23 is coupled with the gate of the power switch transistor 25.

The third switch transistor 24 includes an NMOS transistor. The gate of the third switch transistor 24 is the control terminal of the third switch transistor 24, the drain of the third switch transistor 24 is the first terminal of the third switch transistor 24, and the source of the third switch transistor 24 is the second terminal of the third switch transistor 24. The gate of the third switch transistor 24 is coupled with the output terminal of the control module 21 through the second buffer 27, the drain of the third switch transistor 24 is coupled with the gate of the power switch transistor 25, and the source of the third switch transistor 24 is grounded.

In the switch power supply circuit of the present disclosure, the first terminal of the second switch transistor 23 is directly coupled to the input voltage Vin, and the second switch transistor 23 can directly obtain sufficient driving current from the input voltage Vin to drive the power switch transistor 25. The present application can ensure the reliability and efficiency of the system without an additional energy storage capacitor, which reduces the costs of the system. At the same time, the first switch transistor 22 supplies power to the control module 21, and the second switch transistor 23 supplies power to the power switch transistor 25, which reduces interference to the control module 21.

In summary, the present disclosure provides a switch power supply circuit, which includes: a step-down transistor, a control module, a first switch transistor, a second switch transistor, a third switch transistor, and a power switch transistor. The step-down transistor includes a first terminal, a second terminal, and a third terminal. The first terminal of the step-down transistor is coupled with an input voltage, and the second terminal of the step-down transistor is grounded. The first switch transistor includes a first terminal, a second terminal, and a control terminal, the control terminal of the first switch transistor is coupled with a reference voltage signal, the first terminal of the first switch transistor is coupled with the third terminal of the step-down transistor. The control module includes an input terminal, an output terminal, and a grounded terminal, the input terminal of the control module is coupled with the second terminal of the first switch transistor, and the grounded terminal of the control module is grounded, the control module is configured to generate a first control signal and a second control signal, which are output through the output terminal of the control module. The power switch transistor includes a first terminal, a second terminal, and a control terminal. The second switch transistor includes a first terminal, a second terminal, and a control terminal, the control terminal of the second switch transistor is coupled with the output terminal of the control module to receive the first control signal, the first terminal of the second switch transistor is coupled with the input voltage, and the second terminal of the second switch transistor is coupled with the control terminal of the power switch transistor. The third switch transistor includes a first terminal, a second terminal, and a control terminal, and the control terminal of the third switch transistor is coupled with the output terminal of the control module to receive the second control signal, the first terminal of the third switch transistor is coupled with the control terminal of the power switch transistor, and the second terminal of the third switch transistor is grounded.

In the switch power supply circuit of the present disclosure, the first terminal of the second switch transistor is directly coupled with the input voltage, and the second switch transistor can directly obtain sufficient driving current from the input voltage to drive the power switch transistor. The present application can ensure the reliability and efficiency of the system without an additional energy storage capacitor, which reduces the costs of the system. At the same time, the first switch transistor supplies power to the control module, and the second switch transistor supplies power to the power switch transistor, which reduces interference to the control module.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. A switch power supply circuit, comprising:
   a step-down transistor, including a first terminal, a second terminal, and a third terminal, the first terminal of the step-down transistor is coupled with an input voltage, and the second terminal of the step-down transistor is grounded;
   a first switch transistor, including a first terminal, a second terminal, and a control terminal, the control terminal of the first switch transistor is coupled with a reference voltage signal, the first terminal of the first switch transistor is coupled with the third terminal of the step-down transistor;
   a control module, including an input terminal, an output terminal, and a grounded terminal, the input terminal of the control module is coupled with the second terminal of the first switch transistor, and the grounded terminal of the control module is grounded, the control module is configured to generate a first control signal and a second control signal, which are output through the output terminal of the control module;
   a power switch transistor, including a first terminal, a second terminal, and a control terminal;
   a second switch transistor, including a first terminal, a second terminal, and a control terminal, the control terminal of the second switch transistor is coupled with the output terminal of the control module to receive the first control signal, the first terminal of the second switch transistor is coupled with the input voltage, and the second terminal of the second switch transistor is coupled with the control terminal of the power switch transistor; and
   a third switch transistor, including a first terminal, a second terminal, and a control terminal, and the control terminal of the third switch transistor is coupled with the output terminal of the control module to receive the second control signal, the first terminal of the third switch transistor is coupled with the control terminal of the power switch transistor, and the second terminal of the third switch transistor is grounded.

2. The switch power supply circuit according to claim 1, further comprising:

a first buffer, one terminal of the first buffer is coupled with the output terminal of the control module, the other terminal of the first buffer is coupled with the control terminal of the second switch transistor, and the output terminal of the control module is coupled with the control terminal of the second switch transistor through the first buffer; and a second buffer, one terminal of the second buffer is coupled with the output terminal of the control module, the other terminal of the second buffer is coupled with the control terminal of the third switch transistor, and the output terminal of the control module is coupled with the control terminal of the third switch transistor through the second buffer.

3. The switch power supply circuit according to claim 1, further comprising: a freewheeling circuit, one terminal of the freewheeling circuit is coupled with the input voltage, and the other terminal of the freewheeling is coupled with the first terminal of the power switch transistor.

4. The switch power supply circuit according to claim 3, wherein the freewheeling circuit comprises:

an inductor, one terminal of the inductor is coupled with the input voltage, and the other terminal of the inductor is coupled with the first terminal of the power switch transistor; and a diode, an anode of the diode is coupled with the first terminal of the power switch transistor, and a cathode of the diode is coupled with the input voltage.

5. The switch power supply circuit according to claim 3, further comprising a sampling resistor, one terminal of the sampling resistor is coupled with the second terminal of the power switch transistor, and the other terminal of the sampling resistor is grounded.

6. The switch power supply circuit according to claim 5, wherein the step-down transistor, the control module, the first switch transistor, the second switch transistor, the third switch transistor, the power switch transistor, the freewheeling circuit, and the sampling resistor are all integrated in a same chip.

7. The switch power supply circuit according to claim 1, wherein the step-down transistor comprises a high voltage withstand transistor, and a withstand voltage of the step-down transistor is greater than or equal to 500 volts; the second switch transistor includes a high voltage withstand device, and a withstand voltage of the second switch transistor is greater than or equal to 500 volts.

8. The switch power supply circuit according to claim 7, wherein the step-down transistor comprises a junction field effect transistor.

9. The switch power supply circuit according to claim 1, wherein the reference voltage signal is generated by a Zener diode or based on a band gap reference voltage.

10. The switch power supply circuit according to claim 1, wherein:

the step-down transistor includes an N-type junction field effect transistor, a gate of the step-down transistor is grounded, and a drain of the step-down transistor is coupled with the input voltage;

the power switch transistor includes an NMOS transistor;

the first switch transistor includes an NMOS transistor, a gate of the first switch transistor is coupled with the reference voltage signal, a drain of the first switch transistor is coupled with a source of the step-down transistor, and a source of the first switch transistor is coupled with the input terminal of the control module;

the second switch transistor includes an NMOS transistor, a gate of the second switch transistor is coupled with the output terminal of the control module, a drain of the second switch transistor is coupled with the input voltage, a source of the second switch transistor is coupled with a gate of the power switch transistor; and the third switch transistor includes an NMOS transistor, a gate of the third switch transistor is coupled with the output terminal of the control module, a drain of the third switch transistor is coupled with the gate of the power switch transistor, and a source of the third switch transistor is grounded.

\* \* \* \* \*